(12) United States Patent
Wang et al.

(10) Patent No.: US 9,283,497 B2
(45) Date of Patent: Mar. 15, 2016

(54) ABRASION RESISTANT GAS SEPARATOR

(71) Applicant: GE Oil & Gas ESP, Inc., Oklahoma City, OK (US)

(72) Inventors: Chengbao Wang, Oklahoma City, OK (US); Kelly Pidsadowski, Devon (CA)

(73) Assignee: GE Oil & Gas ESP, Inc., Oklahoma City, OK (US)

(*) Notice: Subject to any disclaimer, the term of this patent is extended or adjusted under 35 U.S.C. 154(b) by 311 days.

(21) Appl. No.: 13/757,309

(22) Filed: Feb. 1, 2013

(65) Prior Publication Data
US 2014/0216720 A1    Aug. 7, 2014

(51) Int. Cl.
*E21B 43/38* (2006.01)
*B01D 19/00* (2006.01)
*E21B 43/12* (2006.01)
*B01D 21/26* (2006.01)

(52) U.S. Cl.
CPC .......... *B01D 19/0052* (2013.01); *E21B 43/121* (2013.01); *E21B 43/128* (2013.01); *E21B 43/38* (2013.01); *B01D 21/267* (2013.01)

(58) Field of Classification Search
CPC ........ E21B 43/38; E21B 43/128; B01D 19/00
USPC ....................................................... 166/105.5
See application file for complete search history.

(56) References Cited

U.S. PATENT DOCUMENTS

| | | | |
|---|---|---|---|
| 3,300,950 A | | 1/1967 | Carle |
| 4,981,175 A | * | 1/1991 | Powers .................. 166/265 |
| 6,116,338 A | * | 9/2000 | Morrison et al. ......... 166/105.5 |
| 7,461,692 B1 | | 12/2008 | Wang |
| 7,841,826 B1 | * | 11/2010 | Phillips ................... 415/121.1 |
| 2010/0258306 A1 | * | 10/2010 | Camilleri et al. ........ 166/265 |
| 2012/0073800 A1 | | 3/2012 | Janitz |
| 2012/0269614 A1 | | 10/2012 | Bassett |

OTHER PUBLICATIONS

International Search Report and Written Opinion issued in connection with corresponding PCT Application No. PCT/US2014/011403 on Nov. 11, 2014.

* cited by examiner

*Primary Examiner* — Kenneth L Thompson
(74) *Attorney, Agent, or Firm* — Crowe & Dunlevy, P.C.

(57) ABSTRACT

A gas separator is configured to separate gas from a two-phase fluid. The gas separator includes a rotatable shaft and one or more separation stages. At least one of the one or more separation stages includes a rotor connected to the rotatable shaft and a channeled compression tube, wherein the channeled compression tube includes a compression tube hub and a plurality of channels. The channels are configured to isolate abrasive solid particles from the rotary components within the gas separator. The gas separator may optionally include a streamer upstream from the separation stage that reduces rotational currents upstream from the rotor.

17 Claims, 7 Drawing Sheets

ABRASION RESISTANT GAS SEPARATOR

FIELD OF THE INVENTION

This invention relates generally to the field of downhole pumping systems, and more particularly to gas separators for separating gas from well fluid prior to pumping.

BACKGROUND

Submersible pumping systems are often deployed into wells to recover petroleum fluids from subterranean reservoirs. Typically, a submersible pumping system includes a number of components, including an electric motor coupled to one or more pump assemblies. Production tubing is connected to the pump assemblies to deliver the wellbore fluids from the subterranean reservoir to a storage facility on the surface.

The wellbore fluids often contain a combination of liquids and gases. Because most downhole pumping equipment is primarily designed to recover liquids, excess amounts of gas in the wellbore fluid can present problems for downhole equipment. For example, the centrifugal forces exerted by downhole turbomachinery tend to separate gas from liquid, thereby increasing the chances of cavitation or vapor lock.

Gas separators have been used to remove gas before the wellbore fluids enter the pump. In operation, wellbore fluid is drawn into the gas separator through an intake. A lift generator provides additional lift to move the wellbore fluid into an agitator. The agitator is typically configured as a rotary paddle that imparts centrifugal force to the wellbore fluid. As the wellbore fluid passes through the agitator, heavier components, such as oil and water, are carried to the outer edge of the agitator blade, while lighter components, such as gas, remain close to the center of the agitator. In this way, modern gas separators take advantage of the relative difference in specific gravities between the various components of the two-phase wellbore fluid to separate gas from liquid. Once separated, the liquid can be directed to the pump assembly and the gas vented from the gas separator.

In sandy wells, solid particles entrained within the well fluid can be carried by into the gas separator. These solid particles can cause substantial abrasion to various components within the gas separator and downstream pumping systems. The abrasion of precisely machined components can significantly diminish the efficiency and service life the gas separator.

In the past, manufacturers have employed hardened materials to reduce the impact of abrasive solid particles. Tungsten carbide, nickel boron and other coatings have been applied to extend the life of components exposed to abrasive particles. In extremely sandy wells, however, even hard-coated parts may not adequately extend the service life of the components within the gas separator. There is therefore a continued need for an improved gas separator design that is more resistant to abrasive solid particles. It is to these and other deficiencies in the prior art that the present invention is directed.

SUMMARY OF THE INVENTION

In a preferred embodiment, the present invention includes gas separator configured to separate gas from a two-phase fluid. The gas separator includes a rotatable shaft and one or more separation stages. At least one of the one or more separation stages includes a rotor connected to the rotatable shaft and a channeled compression tube, wherein the channeled compression tube includes a compression tube hub and a plurality of channels. The channels are configured to isolate abrasive solid particles from the rotary components within the gas separator. The gas separator may optionally include a streamer upstream from the separation stage that reduces rotational currents upstream from the rotor.

DETAILED DESCRIPTION OF THE PREFERRED EMBODIMENT

As used herein, the term "petroleum" refers broadly to all mineral hydrocarbons, such as crude oil, gas and combinations of oil and gas. Furthermore, as used herein, the term "two-phase" refers to a fluid that includes a mixture of gases and liquids. It will be appreciated by those of skill in the art that, in the downhole environment, a two-phase fluid may also carry solids and suspensions. Accordingly, as used herein, the term "two-phase" not exclusive of fluids that contain liquids, gases, solids, or other intermediary forms of matter.

Figure 1:
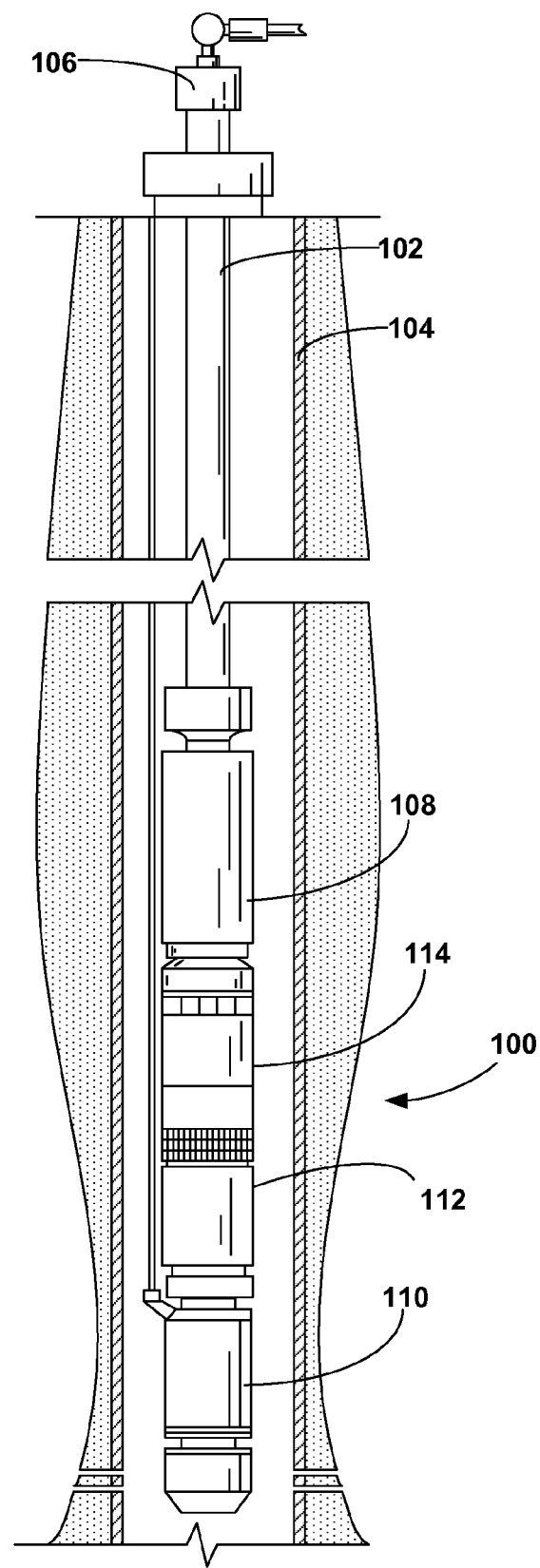
FIG. 1 is a side elevational view of a downhole pumping system constructed in accordance with a preferred embodiment.

In accordance with a preferred embodiment of the present invention, FIG. 1 shows an elevational view of a pumping system 100 attached to production tubing 102. The pumping system 100 and production tubing 102 are disposed in a wellbore 104, which is drilled for the production of a fluid such as water or petroleum. The production tubing 102 connects the pumping system 100 to a wellhead 106 located on the surface. Although the pumping system 100 is primarily designed to pump petroleum products, it will be understood that the present invention can also be used to move other fluids. It will also be understood that, although each of the components of the pumping system 100 are primarily disclosed in a submersible application, some or all of these components can also be used in surface pumping operations.

The pumping system 100 preferably includes some combination of a pump assembly 108, a motor assembly 110, a seal section 112 and a gas separator 114. The seal section 112 shields the motor assembly 110 from mechanical thrust produced by the pump assembly 108 and provides for the expansion of motor lubricants during operation. The gas separator 114 is preferably connected between the seal section 112 and the pump assembly 108.

During use, wellbore fluids are drawn into the gas separator 114 where some fraction of the gas component is separated and returned to the wellbore 104. The degassed wellbore fluid is then passed from the gas separator 114 to the pump assembly 108 for delivery to the surface through the production tubing 102. Although only one of each component is shown, it will be understood that more can be connected when appropriate. For example, in many applications, it is desirable to use tandem-motor combinations, multiple seal sections and multiple pump assemblies. It will be further understood that the pumping system 100 may include additional components not necessary for the present description.

For the purposes of the disclosure herein, the terms "upstream" and "downstream" shall be used to refer to the relative positions of components or portions of components with respect to the general flow of fluids produced from the wellbore 104. "Upstream" refers to a position or component that is passed earlier than a "downstream" position or component as fluid is produced from the wellbore 104. The terms "upstream" and "downstream" are not necessarily dependent on the relative vertical orientation of a component or position. It will be appreciated that many of the components in the pumping system 100 are substantially cylindrical and have a common longitudinal axis that extends through the center of the elongated cylinder and a radius extending from the longitudinal axis to an outer circumference. Objects and motion may be described in terms of radial positions within discrete components in the pumping system 100.

Figure 2:
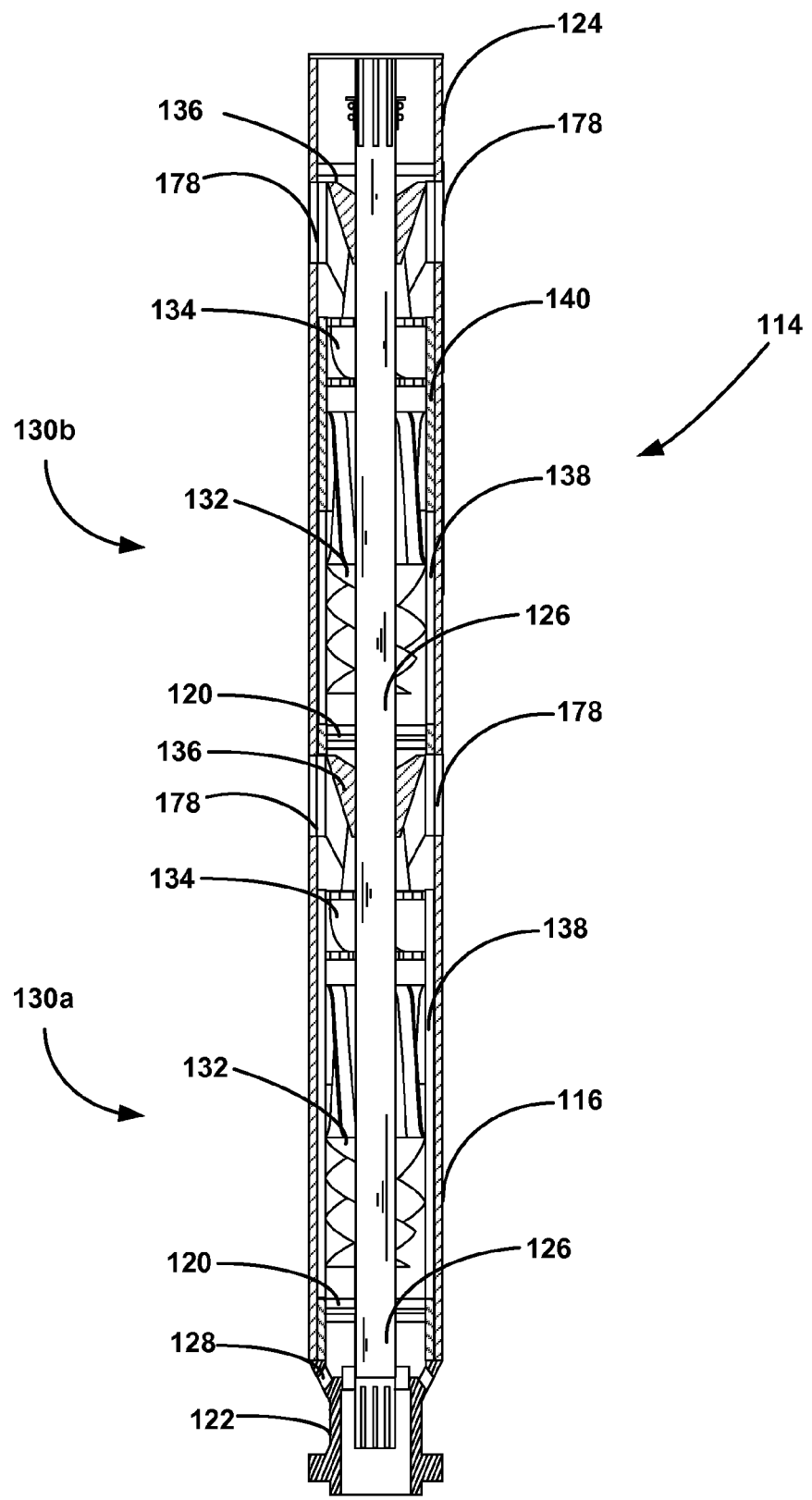
FIG. 2 is a partial cross-sectional view of a gas separator constructed in accordance with a preferred embodiment.

Turning now to FIG. 2, shown therein is a partial cross-sectional view of the gas separator 114. In the preferred embodiment, the gas separator 114 preferably includes an outer housing 116, a streamer 120, a base 122 and a head 124. The gas separator 114 also includes a shaft 126 that extends from the base 122 to the head 124. The base 122 includes intake ports 128 through which fluid is introduced into the gas separator 114. The outer housing 116 is preferably cylindrical and substantially unitary in construction.

The gas separator 114 preferably has one or more separation stages 130 ("stages 130"). In the particularly preferred embodiment shown in FIG. 2, the gas separator 114 includes a first stage 130a and a second stage 130b. It will be appreciated by those of skill in the art that additional or fewer stages 130 may used to address the requirements of a particular gas separation application. Each stage 130 preferably includes a rotor 132, a diffuser 134 and a crossover 136. Each stage 130 also preferably includes a channeled compression tube 138 and a conventional, unchanneled compression tube 140. The channeled compression tube 138 and unchanneled compression tube 140 reside within the interior of the outer housing 116 and surround the rotor 132 and diffuser 134. Although both the channeled compression tube 138 and unchanneled compression tube 140 are shown in FIG. 2, it will be appreciated that alternate embodiments include the use of only channeled compression tubes 138 or only unchanneled compression tubes 140.

Figure 3:
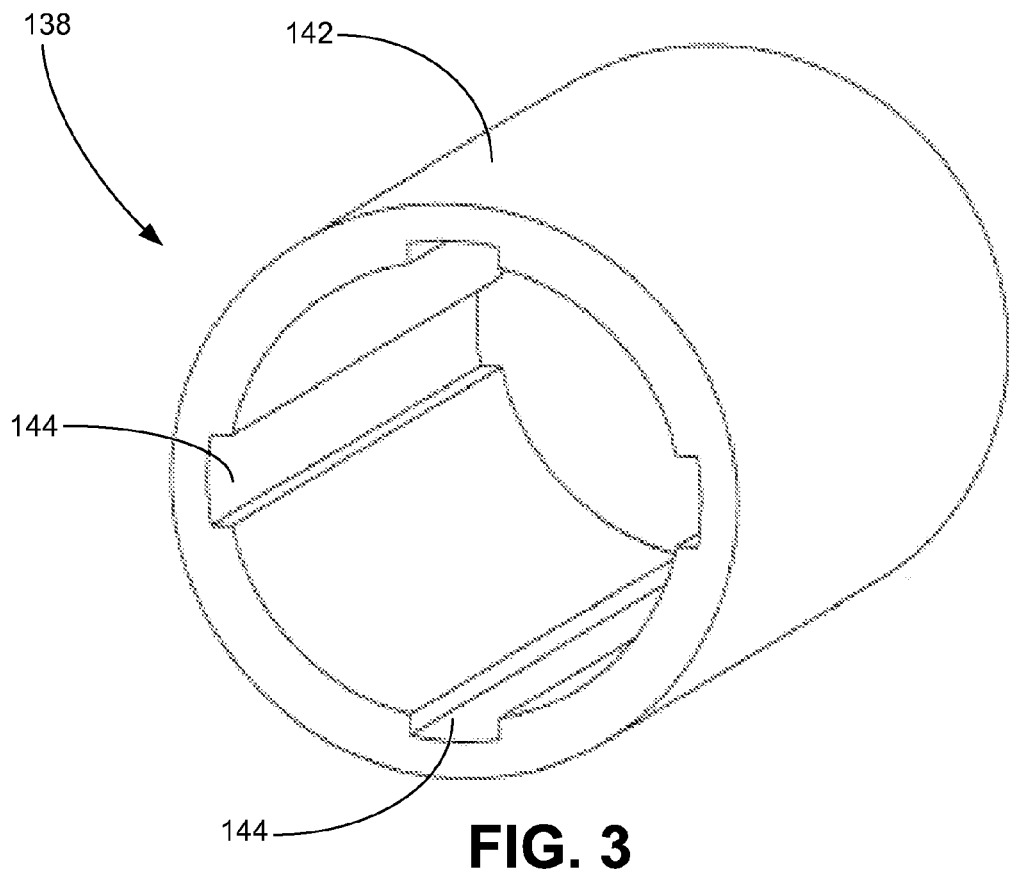
FIG. 3 is a perspective view of the upstream side of the channeled compression tube of FIG. 2.
Figure 4:
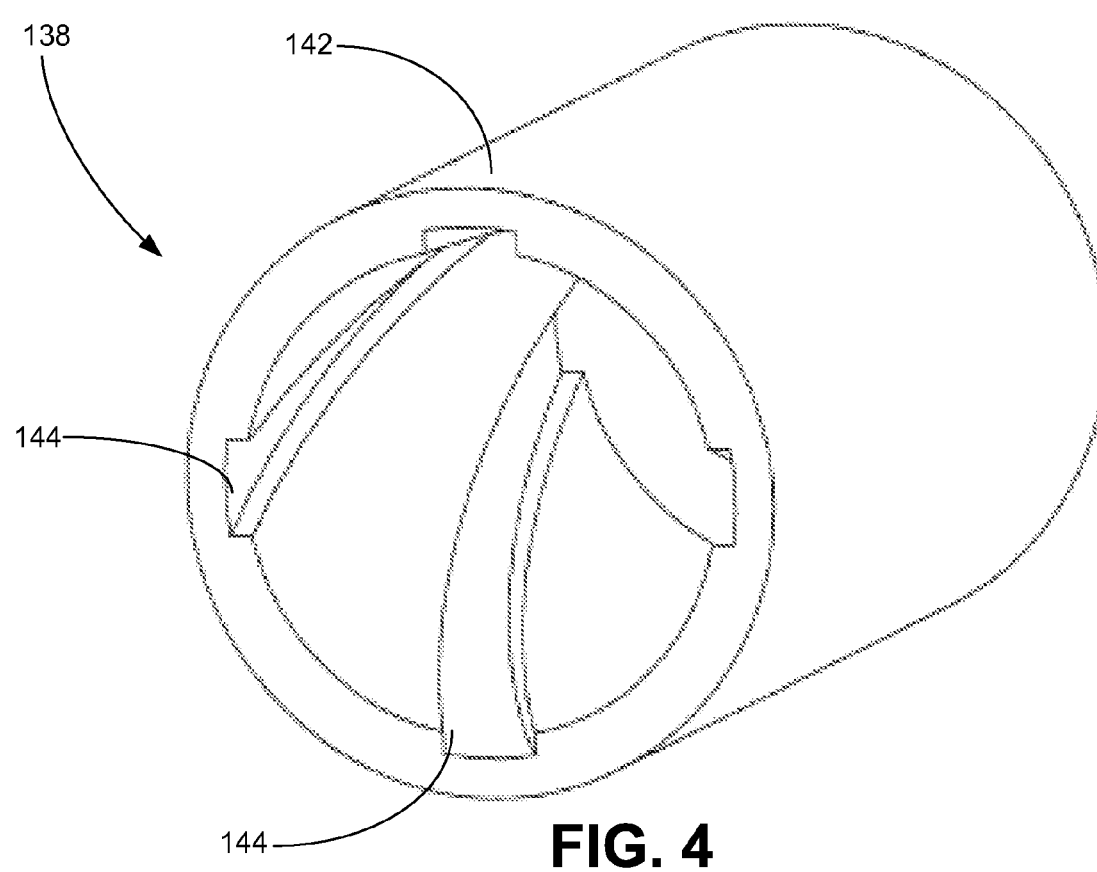
FIG. 4 is a perspective view of the upstream side of an alternate embodiment of the channeled compression tube of FIG. 2.

As more clearly depicted in FIGS. 3 and 4, the channeled compression tube 138 includes a compression tube hub 142 and a series of channels 144 located along the interior wall of the compression tube hub 142. Unlike prior art compression tubes, the channels 144 within the channeled compression tube 138 trap solid particles that are entrained within fluid passing through the stage 130. The rotation of fluid through the stage 130 causes the heavier liquids and solids to be forced against the channeled compression tube 138, where the solid particles are captured by the channels 144. The solid particles are then prevented from abrading components within the stage 130. The channels 144 may be straight (as depicted in FIG. 3) or spiraled (as depicted in FIG. 4). Additionally, it will be noted that the channeled compression tube 138 can run through substantially all of the stage 130 (as depicted in stage 130a), or for only a portion of the stage (as depicted in stage 130b).

Figure 5:
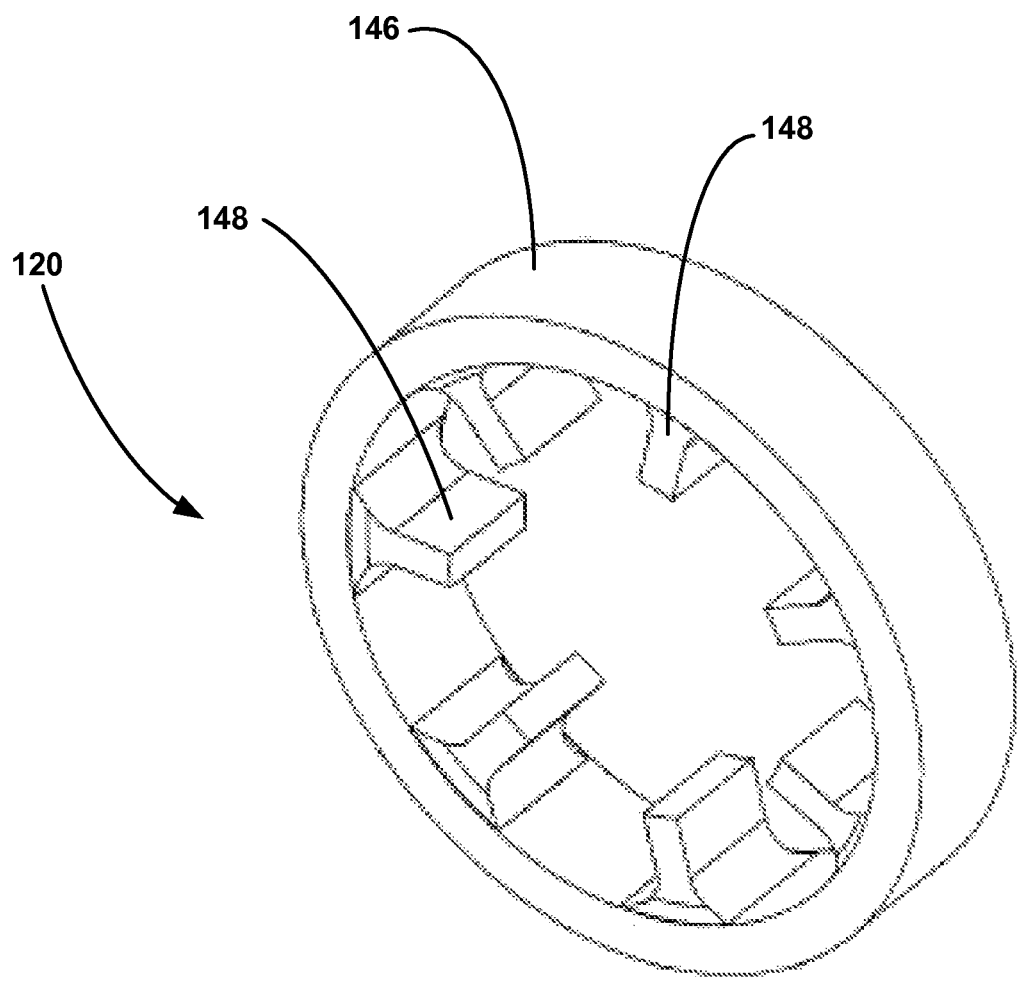
FIG. 5 is a perspective view of the streamer of the gas separator of FIG. 2.

Turning to FIG. 5, shown therein is a perspective view of a presently preferred embodiment of the streamer 120. The streamer 120 preferably includes a streamer hub 146 and a plurality of streamer vanes 148. The streamer vanes 148 extend inward from the streamer hub 146 and terminate at a length that permits the passage of the shaft 126 through the center of the streamer 120. The streamer vanes 148 are preferably axially straight and aligned along the longitudinal axis of the gas separator 114. Although seven streamer vanes 148 are shown in FIG. 5, it will be appreciated that greater or fewer numbers of streamer vanes 148 could also be employed. The streamer 120 remains stationary in the housing 116 and the straight streamer vanes 148 block the rotational movements of backflows caused by the rotor 132. Eliminating rotational backflows at the entrance of the inducer reduces abrasive wear on upstream components.

Figure 6:
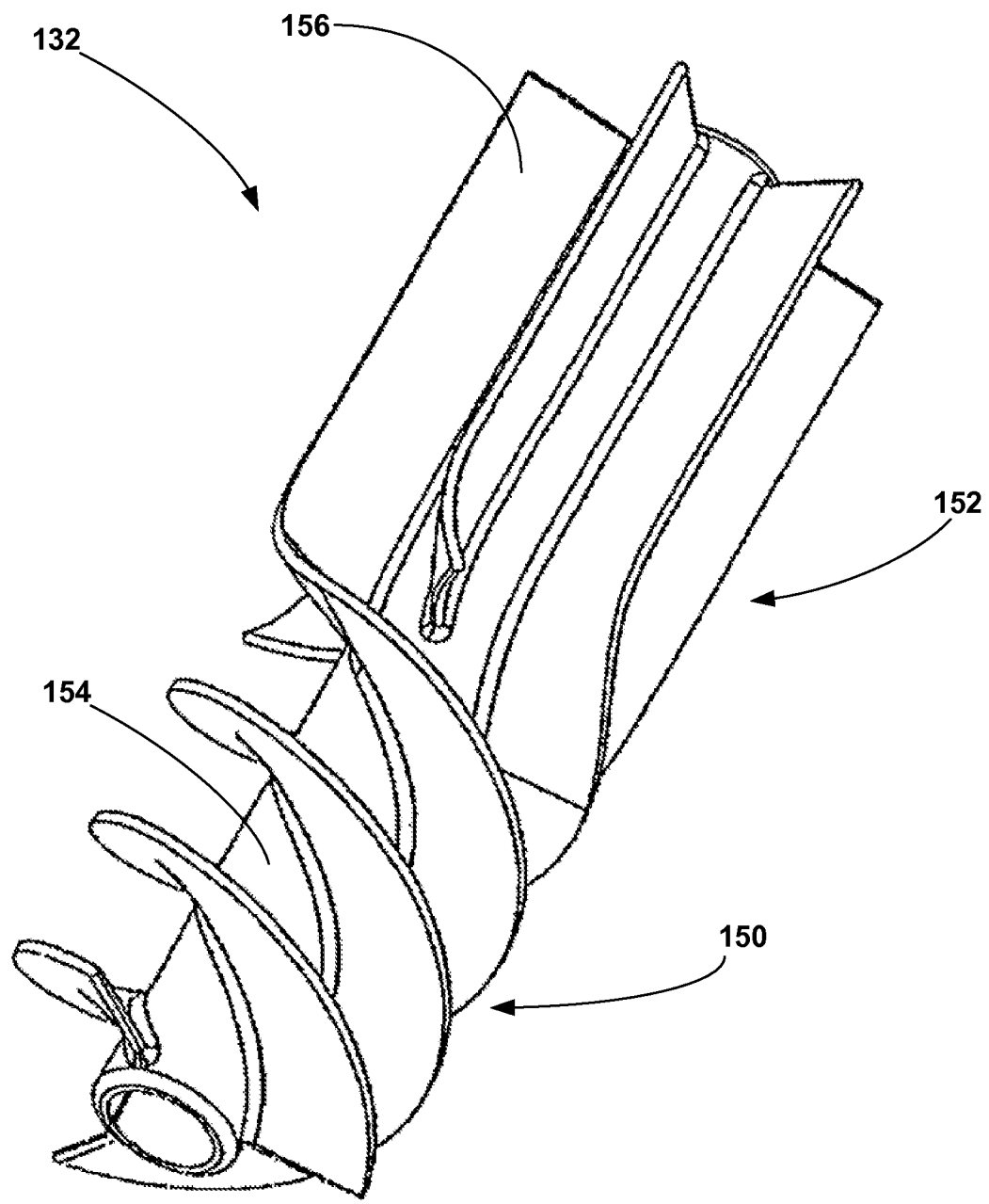
FIG. 6 is a perspective view of the rotor of the gas separator of FIG. 2.

Turning to FIG. 6, shown therein is a perspective view of the rotor 132. The rotor 132 preferably includes an inducer 150, an impeller 152 and a rotor hub 154. The rotor hub 154 is configured for connection to the shaft 126 to cause the rotor 132 to rotate with the shaft 126. The rotor hub 154 can be secured to the shaft 126 with any suitable means, including press-fittings, keys or snap-rings. The rotor 132 is preferably secured to the shaft 126 in the upstream end of each stage 130.

In the presently preferred embodiment, inducer 150 is configured as a screw-type pump that moves wellbore fluids from the intake ports 128 to the impeller 152. The impeller 152 preferably has a plurality of paddles 156 that are designed to agitate the fluid passing through the gas separator 114 while the rotor 132 is spinning. The rotating action of the impeller 152 imparts energy to the fluid passing through rotor 132 and causes bubbles to precipitate from the wellbore fluid. In the particularly preferred embodiment, shown in FIG. 6, the rotor 132 includes six paddles 156, with each alternating paddle 156 being connected to a separate screw of the inducer 150.

Figure 7:
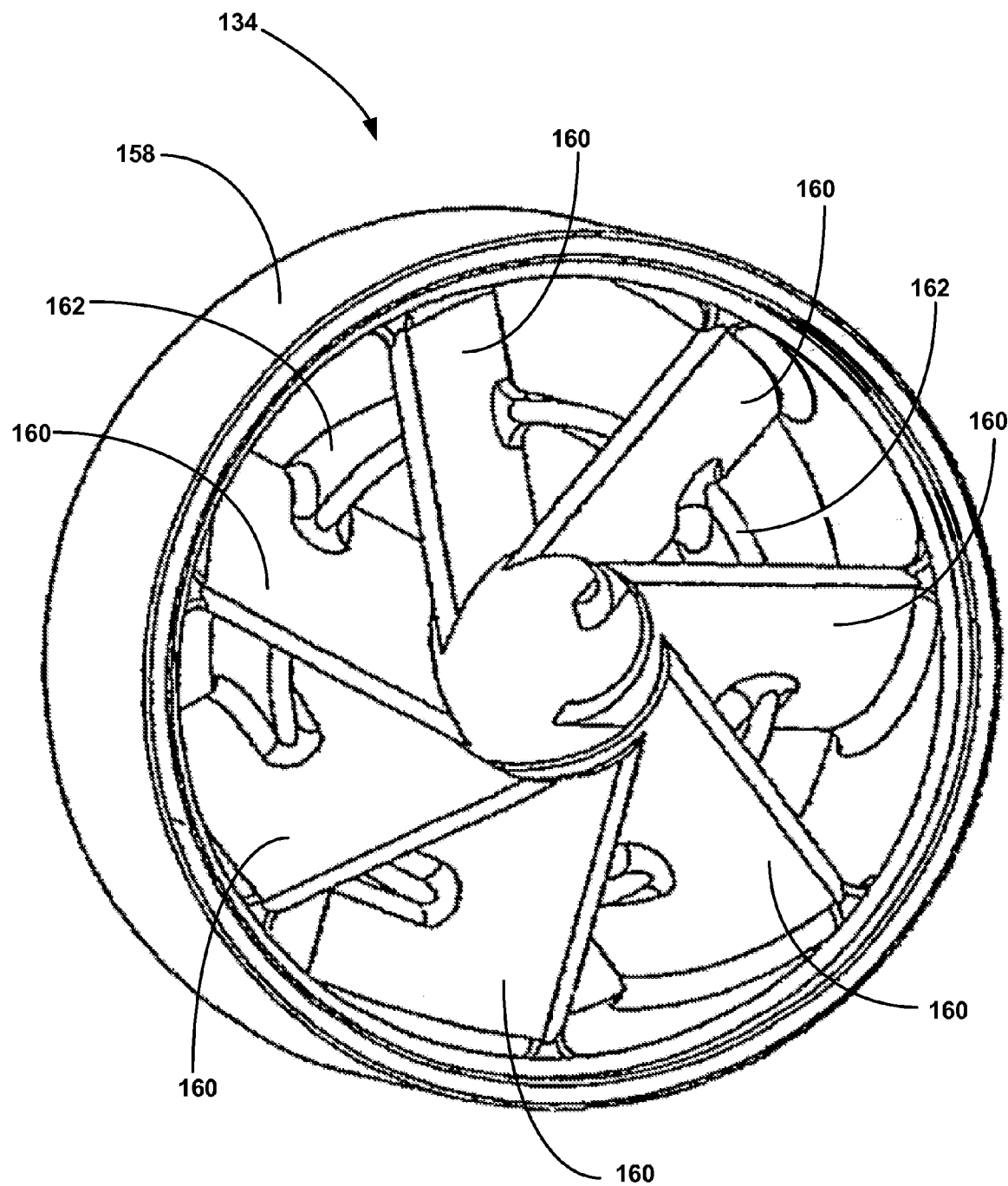
FIG. 7 is a perspective view of the upstream side of the diffuser of the gas separator of FIG. 2.

Turning now to FIG. 7, shown therein is a perspective view of the diffuser 134. The diffuser 134 includes a diffuser rim 158, a plurality of curved diffuser vanes 160 and a separation ring 162. The diffuser rim 158 is sized and configured to be stationarily secured within the channeled compression tube 138 or unchanneled compression tube 140 in a position downstream from the rotor 132. The plurality of curved diffuser vanes 160 are designed with a curved face to condition the circular flow of fluid leaving the rotor 132. The flow profile leaving the diffuser 134 is substantially less turbulent with less rotation. In modifying the flow profile of the passing fluid, the diffuser 134 converts a portion of the dynamic energy imparted to the fluid by the rotor 132 into pressure head. A first end of each curved diffuser vane 160 is connected to the diffuser rim 158, while a second end of each curved diffuser vane 160 is unattached and terminates in a position proximate the rotatable shaft 126. In this way, the second end of the curved diffuser vane 160 is "free-floating." In the absence of a hub on which the curved diffuser vanes 160 might otherwise terminate, the separation ring 162 is used to stabilize the curved diffuser vanes 160.

Figure 8:
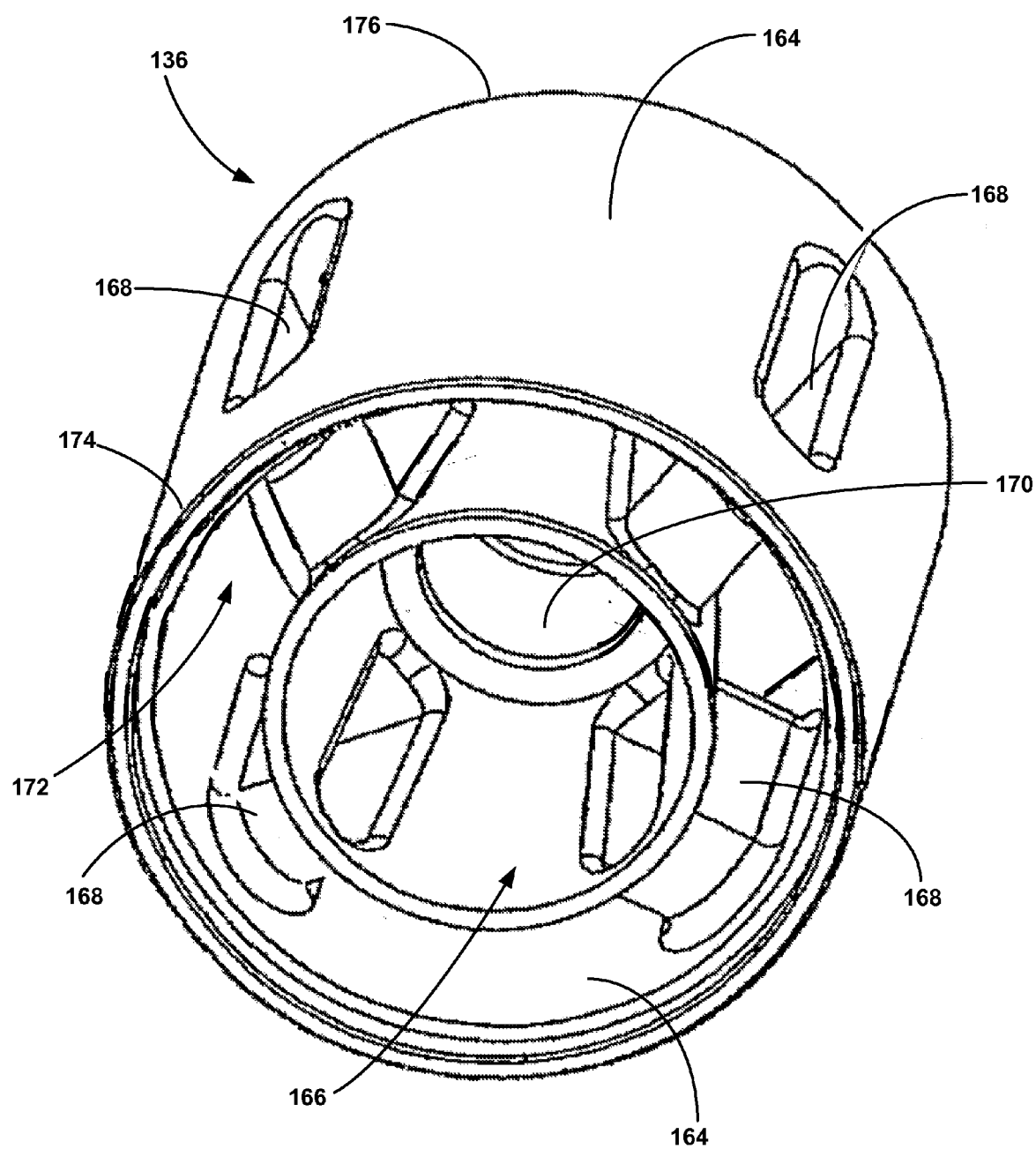
FIG. 8 is a perspective view of the upstream side of the crossover assembly of the gas separator of FIG. 2.

Turning next to FIG. 8, shown therein is a perspective view of the crossover 136. The crossover 136 is preferably positioned in close proximity with the downstream side of the diffuser 134. The crossover 136 includes an outer wall 164, an inner chamber 166, a plurality of gas ports 168 and a shaft support 170. The outer wall 164 is sized and configured to fit within the inner diameter of the channeled compression tube 138 or unchanneled compression tube 140. The annular space between the inner chamber 166 and the outer wall 164 defines a liquid path 172. The shaft 126 (not shown in FIG. 8) passes through the inner chamber 166 and through the shaft support 170. In the presently preferred embodiment, the exterior of the shaft 126 fits in close tolerance with the shaft support 170. In addition to stabilizing the shaft 126, the shaft support 170 acts with the shaft 126 to close the downstream end of the inner chamber 166.

The inner chamber 166 is preferably tapered from a larger diameter at an upstream end 174 to a smaller diameter at the downstream end 176. As the liquid path 172 gradually enlarges along the length of the crossover 136, the fluid velocity decreases and pressure increases to encourage the formation of larger sized bubbles, which are more easily separated in downstream stages 130.

The gas ports 168 are preferably manufactured as open-ended tubes that pass through the liquid path 172 from the inner chamber 166. The gas ports 168 preferably extend radially from the inner chamber 166 at a forward angle with respect to a longitudinal axis through the crossover 136. The angular disposition of the gas ports 168 improves the removal of gas moving through crossover 136. Although four gas ports 168 are presently preferred, it will be understood that alternate embodiments contemplate the use of additional or fewer gas ports 168.

The crossover 136 collects liquid from an outer radial portion of the gas separator 114 and directs the liquid through the liquid path 172 to downstream stages 130 or other downstream equipment, such as the pump assembly 108. Gas in a center radial portion of the gas separator 114 is captured by the crossover 136 and temporarily trapped in the inner chamber 166. The trapped gas is directed from the inner chamber 166 through the gas ports 168 to the exterior of the outer wall 164.

As shown in FIG. 2, at the points along the gas separator 114 where a crossover 136 is located, the outer housing 116 includes discharge ports 178 that are aligned with the gas ports 168. The discharge ports 178 conduct the gas from the crossover 136 to the external environment through the outer housing 116. If multiple stages 130 are employed, the outer housing 116 will include separate groups of discharge ports 178 adjacent each set of gas ports 168 along the length of the outer housing 116.

Turning back to FIG. 2, it is significant that the gas separator 114 is configured as a modular design in which a plurality of stages 130 can be easily installed within the gas separator 114. Multiple stages 130 can be used without the need for obtrusive couplers between adjacent sections. The rotor 132 of each stage 130 can be connected to the common shaft 126. In a highly preferred embodiment, the use of multiple stages 130, each with a rotor 132, diffusers 134 and crossover 136, improves the overall extent to which gas is removed from the mixed flow entering the gas separator 114.

During use, two-phase wellbore fluids are drawn into the gas separator 114 through the intake ports 128 by the rotor 132. In some applications, the downstream pump assembly 108 may also contribute to the suction used to draw wellbore fluids into the gas separator 114.

The two-phase wellbore fluids pass through the intake ports 128 and through the streamer 120. The streamer 120 restricts the rotation of the two-phase fluid while providing limited resistance to the axial movement of the two-phase fluid. The two-phase fluid enters the first stage 130a and is moved downstream by the inducer 150 and then agitated and energized by the impeller 152. The spinning impeller 152 imparts a rotational flow profile to the two-phase fluid in which heavier components separate from lighter components as dense fluids are drawn outward by centrifugal force. Lighter gas and two-phase fluids remain in the center of the rotor 132.

The rotating fluid continues its path through the first stage 130a and passes through the diffuser 134. The curved diffuser vanes 160 on the diffuser 134 reduce the rotation of the fluid as it enters the crossover 136. In the crossover 136, the gas and lighter components of the two-phase fluid are removed from the gas separator 114 through the gas ports 168. The liquids and heavier two-phase fluids pass through the liquid path 172 to the adjacent stage 130b.

The second stage 130b operates in the same manner as the first stage 130a by successively separating and removing remaining quantities of gas from the two-phase fluid. The removal of gas at multiple points along the gas separator 114 greatly improves the efficiency of the separation.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A gas separator configured to separate gas from a two-phase fluid, the gas separator comprising:
   a rotatable shaft; and
   one or more separation stages, wherein at least one of the one or more separation stages comprises:
      a rotor connected to the rotatable shaft; and
      a channeled compression tube, wherein the channeled compression tube comprises:
         a compression tube hub; and
         a plurality of channels, wherein the plurality of channels are spiraled.

2. The gas separator of claim 1, further comprising a streamer positioned upstream from at least one of the one or more separation stages.

3. The gas separator of claim 2, wherein the streamer comprises:
   a streamer hub; and
   a plurality of streamer vanes extending inward from the streamer hub.

4. The gas separator of claim 3, wherein the plurality of streamer vanes are straight and axially aligned with the longitudinal axis of the gas separator.

5. A gas separator configured to separate gas from a two-phase fluid, the gas separator comprising:
   a rotatable shaft; and
   one or more separation stages, wherein at least one of the one or more separation stages comprises:
      a rotor connected to the rotatable shaft; and
      a channeled compression tube, wherein the channeled compression tube comprises:
         a compression tube hub; and
         a plurality of channels;
      a diffuser downstream from the rotor; and
      a crossover downstream from the diffuser, wherein each crossover is configured to remove gas from its respective separation stage.

6. The gas separator of claim 5, wherein the plurality of channels are straight and axially aligned with the longitudinal axis of the gas separator.

7. The gas separator of claim 5, further comprising an outer housing, wherein the outer housing includes a separate group of discharge ports for each separation stage to permit the removal of gas from each separation stage.

8. A gas separator configured to separate gas from a two-phase fluid, the gas separator comprising:
- a rotatable shaft;
- one or more separation stages, wherein at least one of the one or more separation stages comprises:
  - a rotor connected to the rotatable shaft; and
  - a channeled compression tube, wherein the channeled compression tube comprises:
    - a compression tube hub; and
    - a plurality of channels, wherein the plurality of channels are spiraled; and
- a streamer positioned upstream from at least one of the one or more separation stages.

9. The gas separator of claim 8, wherein the streamer comprises:
- a streamer hub; and
- a plurality of streamer vanes extending inward from the streamer hub.

10. The gas separator of claim 9, wherein the plurality of streamer vanes are straight and axially aligned with the longitudinal axis of the gas separator.

11. A gas separator configured to separate gas from a two-phase fluid, the gas separator comprising:
- a rotatable shaft;
- one or more separation stages, wherein the one or more separation stages comprises:
  - a rotor connected to the rotatable shaft;
  - a diffuser downstream from the rotor; and
  - a crossover downstream from the diffuser, wherein each crossover is configured to remove gas from its respective separation stage; and
- a streamer positioned upstream from at least one of the one or more separation stages.

12. The gas separator of claim 11, further comprising an outer housing, wherein the outer housing includes a separate group of discharge ports for each separation stage to permit the removal of gas from each separation stage.

13. The submersible pumping system of claim 12, wherein the gas separator further comprises a streamer positioned upstream from at least one of the one or more separation stages.

14. The gas separator of claim 11, wherein the one or more separation stages further comprises a channeled compression tube.

15. The gas separator of claim 14, wherein the channeled compression tube comprises:
- a compression tube hub; and
- a plurality of channels, wherein the plurality of channels are spiraled.

16. The gas separator of claim 14, wherein the channeled compression tube comprises:
- a compression tube hub; and
- a plurality of channels, wherein the plurality of channels are straight and axially aligned with the longitudinal axis of the gas separator.

17. A submersible pumping system for use in a wellbore having two-phase fluids, the pumping system comprising:
- a pump assembly;
- a motor assembly; and
- a gas separator disposed between the pump assembly and the motor assembly, wherein the gas separator comprises:
  - a rotatable shaft; and
  - one or more separation stages, wherein at least one of the one or more separation stages comprises:
    - a rotor connected to the rotatable shaft; and
    - a channeled compression tube, wherein the channeled compression tube comprises:
      - a compression tube hub; and
      - a plurality of channels, wherein the plurality of channels are spiraled.

* * * * *